United States Patent [19]

Uesaka et al.

[11] Patent Number: 5,028,840

[45] Date of Patent: Jul. 2, 1991

[54] IMAGE DISPLAY PANEL

[75] Inventors: Kazuo Uesaka; Kozo Shimamoto, both of Amagasaki, Japan

[73] Assignee: Mitsubishi Denki Kabushiki Kaisha, Tokyo, Japan

[21] Appl. No.: 307,914

[22] Filed: Feb. 9, 1989

[30] Foreign Application Priority Data

Feb. 10, 1988 [JP] Japan ............................ 63-16570[U]

[51] Int. Cl.[5] ......................... H01J 29/88; H01J 5/16; G09G 1/28; H04N 5/72

[52] U.S. Cl. .................................... 313/466; 313/474; 313/112; 340/702; 358/253

[58] Field of Search ............... 313/466, 473, 474, 479, 313/2.1, 112; 358/250, 253; 430/26, 27; 340/720, 717, 702

[56] References Cited

U.S. PATENT DOCUMENTS

| | | | |
|---|---|---|---|
| 3,891,440 | 6/1975 | Gallaro et al. | 313/474 X |
| 4,416,961 | 11/1983 | Drexhage | 358/253 X |
| 4,635,105 | 1/1987 | Favreau | 340/720 X |
| 4,734,761 | 3/1988 | Kondoh et al. | 313/466 X |

FOREIGN PATENT DOCUMENTS 59-139537 8/1984 Japan .

*Primary Examiner*—Sandra L. O'Shea
*Attorney, Agent, or Firm*—Burns, Doane, Swecker & Mathis

[57] ABSTRACT

The invention relates to a large-size image display panel for outdoor use. The image display panel related to the invention has a number of cathode ray tubes which are respectively provided with a plurality of red luminous bodies, green luminous bodies, and blue luminous bodies illuminating themselves by receiving irradiation of electron beams in the inside of the face plate, while each of those cathode ray tubes is also provided with a red filter, a green filter, and a blue filter which are disposed in the outside of the face plate in correspondence with red luminous bodies, green luminous bodies, and blue luminous bodies. Using these filters provided in correspondence with those luminous bodies, electron beams having specific wavelengths from respective luminous bodies are selectively filtered out. As a result, the image display panel related to the invention sufficiently secures the needed luminance intensity of image and reliably generates a satisfactory image exhibiting sharp contrast and high brilliance constantly.

9 Claims, 2 Drawing Sheets

IMAGE DISPLAY PANEL

BACKGROUND OF THE INVENTION

1. Field of the Invention

The present invention relates to an image display panel such as an extremely large optical display panel for outdoor use.

2. Description of the Prior Art

Any conventional large-dimensional optical display panel installed in a baseball stadium or a soccer stadium uses monochromatic cathode ray tubes each having a spherical surface. Since the spherical surface does not cause external light to reflect from it, viewers can easily watch images on the screen. However, as shown in the publication of the Japanese Patent Application Laid-Open No. 57-208045 (1982), recently, demand has significantly grown for multiple-color cathode ray tubes each having a planar surface for the purpose of increasing vividness of the screen image. When external light reflects from the planar surface or the cathode ray tubes partially discontinue illumination, since the illumination elements are substantially white, the screen image becomes whitish. This makes the image uncomfortable to watch. To improve the contrast of the entire image, the illumination elements themselves or the surface of multiple-color cathode ray tube need to be colored. Nevertheless, to properly color these, there are a variety of technical problems to solve, which are described below.

Coloration of illumination elements themselves does not generate sufficient volume of light. Furthermore, an annealing process is applied to illumination elements which subjects them to a minimum of 400° C. After stabilizing them on a substrate, temperature no material used for coloring in red, blue and green can stand such high annealing temperature. When coloring the planar surface of a multiple-color cathode ray tube with a single colorant, since each illumination element has a specific permeable wavelength different from each other, luminance intensity of the entire screen image decreases, and as a result, viewers cannot distinctly watch the image from a distance.

The volume of light emitted from red, blue, and green luminous elements becomes uneven by presence of those colorants on the surface of multiple-color cathode ray tubes. This prevents the image from generating brilliance.

SUMMARY OF THE INVENTION

The present invention overcomes those technical problems mentioned above by providing a novel image display panel featuring the provision of a plurality of cathode ray tubes each incorporating three-primary-color luminous bodies including red, blue, and green to allow these colors to be emitted by irradiation of electron beams, where these luminous bodies are disposed in the inside of the face plate, and also the provision of three color filters which correspond to these three primary colors and are disposed in the outside of the face plate.

The primary object of the invention is to provide a novel image display panel which securely generates sufficient luminance intensity for an image.

The second object of the invention is to provide a novel image display panel which reliably generates an image having sharp contrast.

The third object of the invention is to provide a novel image display panel which reliably generates an image having high brilliance.

The fourth object of the invention is to provide a novel image display panel which reliably protects all filters by means of hard-coating layers.

The fifth object of the invention is to provide a novel image display panel which properly adjusts permeability of light by means of a colored hard-coating layer.

The above and further objects and features of the invention will more fully be apparent from the following detailed description with accompanying drawings.

DESCRIPTION OF THE PREFERRED EMBODIMENTS

Figure 1:
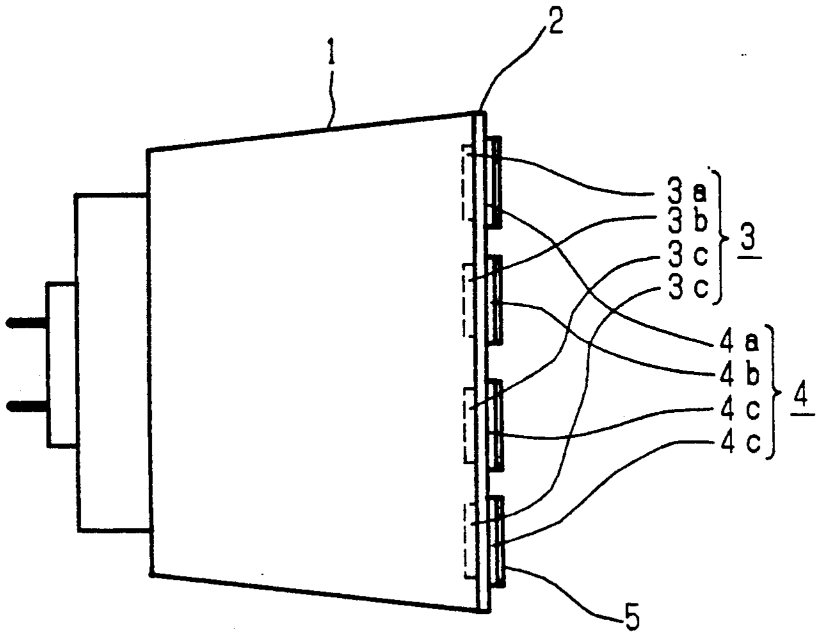
FIG. 1 is a lateral view of the cathode ray tube introduced to the image display related to the invention.

Referring now to the accompanying drawings, a preferred embodiment of the invention is described below. In FIG. 1, the reference numeral 1 designates a cathode ray tube 1, and face plate 2 constituting part of the cathode ray tube 1 is provided in the front of it. Three primary color luminous bodies 3 including red luminous body 3*a*, green luminous body 3*b*, and blue luminous body 3*c*, each illuminating itself by receiving irradiation of electron beams are disposed in the inside of the face plate 2. In correspondence with three luminous bodies 3*a* through 3*c*, filters 4 including red filter 4*a*, green filter 4*b*, and blue filter 4*c*, are respectively provided in the outside of the face plate 2. Each of these filters 4 is covered with hard-coating layer 5.

In this embodiment, each cathode ray tube 1 is composed of a plane luminous tube of composite picture-element system having 16 units of picture elements, i.e., luminous bodies 3 for example. Each luminous body 3 is composed of square shape having 13 mm of side length. Likewise, filter unit 4 is also composed of square shape having 15 mm of side length for example. The face plate 2 of cathode ray tube 1 is also composed of square shape having 7 cm of side length for example. As a result, an extremely large image display panel is eventually formed by assembling 3,000 through a maximum of 12,000 units of cathode ray tubes 1 each having the constitution mentioned above.

Figure 2:
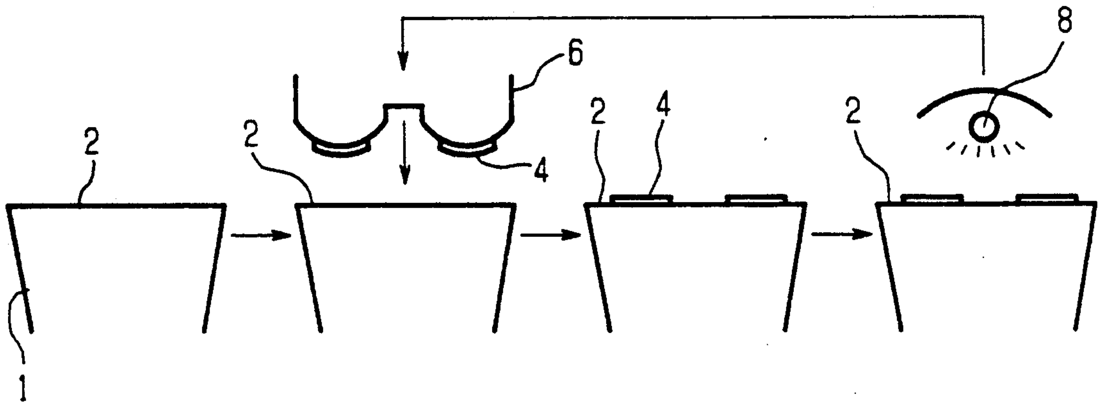
FIG. 2 is a schematic view of part of the process for manufacturing the image display panel related to the invention.
Figure 3:
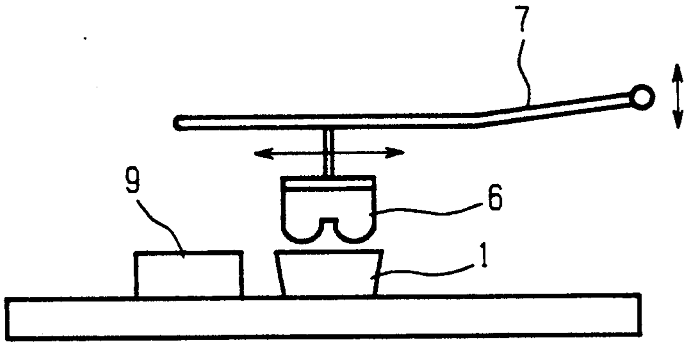
FIG. 3 is a schematic view of the pad printer used in the process for manufacturing the image display panel related to the invention.

Referring now to FIG. 2, the method of disposing filter 4 at the outside of the face plate 2 is described below. First, surface of the face plate 2 is thoroughly cleaned using alkaline or organic solvent so that oily matter and soil can thoroughly be eliminated. Next, using pad printer shown in FIG. 3 and by printing pressure of the pad 6 at 6 kg/cm$^2$ for example, red, green, or blue primary color ink is transferred onto the face plate 2, i.e., onto the outside position of the face plate 2 corresponding to the color of each luminous body 3, generating about 15 microns of film thickness. Ideally, viscosity of the ink should be in a range from 50 cps to a maximum of 3,000 cps. The pad printing substrate 9 should be provided with adeqûate concave and convex at the bottom by 30 microns of depth. The reference numeral 7 designates a lever which gives pressure to pad 6. After completing transfer of one color ink, the ink film layer is exposed to irradiation of an ultraviolet lamp having 80 W/cm of output capacity, i.e., using high-pressure mercury lamp 8 from about 15 cm of distance for about 10 seconds. This completes hardening of the first ink film. Next, by applying the same process as was done for the first ink film layer, the second and third color inks are also transferred onto the face plate 2. After completing transfer of the third color ink, the ink film layer is exposed to irradiation of a high-pressure mercury lamp 8 having 80 W/cm of output capacity from about 15 cm of distance for about 30 seconds. This completes final hardening of the ink film. The color ink film layer is then painted by means of air spray using 1.0 through 2.0 kg/cm$^2$ of pressure to generate 5 microns of protective layer before eventually hardening it by irradiating it with ultraviolet rays.

The large-dimensional image display panel manufactured by the above processes can be provided with each filter 4 corresponding to three primary colors of luminous bodies 3. As a result, the image display panel embodied by the invention sufficiently generates luminance intensity and sharp contrast of image and highly brilliant color image which is very clear even under direct exposure to sunlight.

The above preferred embodiment has provided pad printing substrate 9 with 30 microns of depth. However, depth and the ruggedness of the bottom surface should be varied according to the magnitude of area receiving transfer of color ink. Viscosity of color ink should also be varied according to the magnitude of area receiving transfer of color ink. Although the above preferred embodiment has provided hard-coating layer 5 with 5 microns of thickness, the thickness of hard-coating layer 5 may range from 5 microns to a maximum of 30 microns depending on the thickness of filter 4.

It is essential that the hard-coating layer 5 is transparent. However, in order to properly adjust beam permeation rate, coloring is also allowable.

To implement the above preferred embodiment, inventors used urethane acrylate mainly composed of urethane resin like "GRANDIC" UC-0613, a product of Dai-Nippon Ink Co., Ltd., Japan, for filter 4. The inventors used blends of quinacridone and disazo pigments like RGB-R, a product of Dainichi Seika Co., Ltd., Japan, for red filter 4*a*. The inventors used blends of bromic and disazo pigments like RGB-G, a product of Dainichi Seika Co., Ltd., Japan, for green filter 4*b*. The inventors also used blends of phthalocyanine and violet pigments like RGB-B, a product of Dainichi Seika Co., Ltd., Japan, for blue filter 4*c*. The inventors used 2 through 35 parts of pigments to 100 parts of resinous binder to generate 2 through 50 microns of film thickness. In addition to urethane acrylic binder, acrylic binder, urethane binder, and silicone binder, may also be used. However, according to the test result, from the standpoint of mechanical characteristics, smoothness, beam permeability, handling and processing convenience, and cost, the inventors concluded that urethane acrylate binder was most ideal.

The above preferred embodiment has employed blends of quinacridone, bromic, and phthalocyanine pigments. In addition to these, azoic pigments may also be used only by blending a small amount of these.

Figure 4:
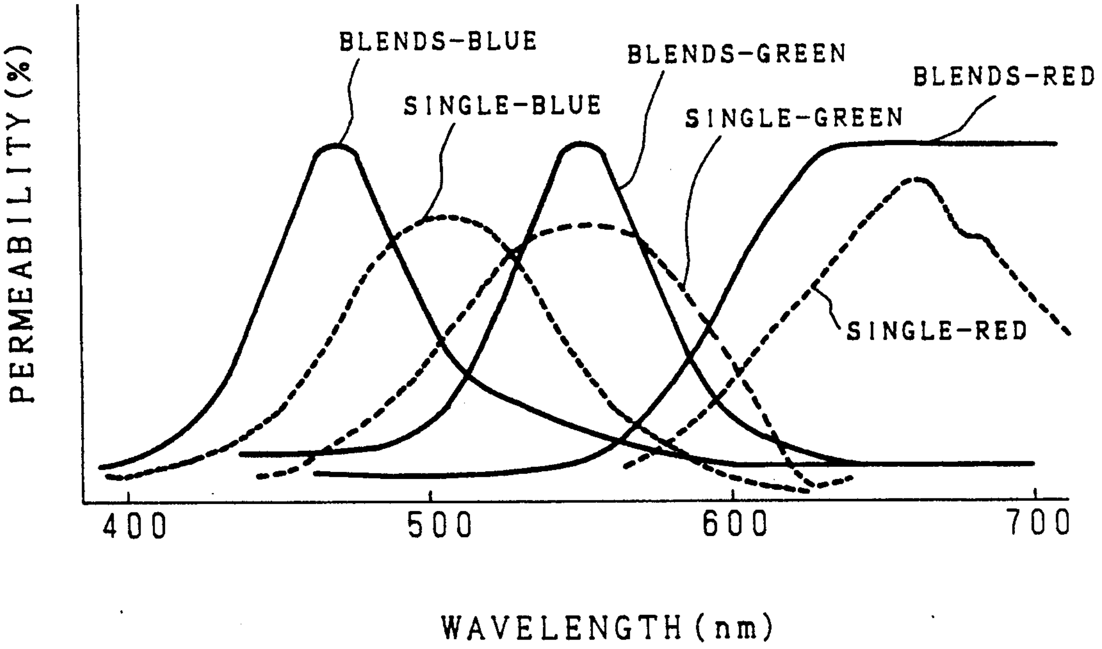
FIG. 4 is a graphical chart representing the characteristic of beam permeation when blended ink and single ink are applied to filters related to the invention.

FIG. 4 is the graphical presentation of the wavelength of permeable beams generated by those filters made from blended and single pigments. Those filters made from single pigments proved to be incompatible with the wave length needed for luminous bodies 3*a* through 3*c*, including a minimum of 600 nanometers for red luminous body 3*a*, 500 through 540 nanometers for green luminous body 3*b*, and 460 through 480 nanometers for blue luminous body 3*c*. Also, those filters made from single pigments could not precisely control wave length of permeable beams. As a result, the inventors proved that blended pigments were ideal for application to filter 4 related to the invention. The following table represents results of testing weatherability of those pigments used for constituting filter 4 related to the invention. In the chart, circles denote a satisfactory rating. Like the above case, blended pigments proved to be satisfactory. Conversely, those single pigments capable of meeting the needed region of wave length of permeable beams proved to have unsatisfactory weatherability.

| | Resistance against Delustering Effect | Resistance against Discoloration, Fading and Whitening Effect |
|---|---|---|
| Blends-Blue | | |
| Blends-Green | | |
| Blends-Red | | |
| Single-Blue | Δ~x | Δ~x |
| Single-Green | Δ~x | Δ~x |
| Single-Red | Δ~x | Δ~x |

The above preferred embodiment has introduced the mixing proportion of binder and pigments to be 100 parts versus 2 through a maximum of 35 parts. If the mixing proportion of pigments is less than 2 parts, unless filter 4 is provided with a minimum of 50 microns of thickness, the volume of permeable beams cannot easily be controlled. Conversely, if the mixing proportion of pigments is more than 35 parts, in order to securely maintain the needed luminance intensity of luminous bodies, thickness of filter 4 should be a maximum of 2 microns. Consequently, manufacturers can hardly produce such filters having a maximum of 2 microns or a minimum of 50 microns of specific thickness. Based on these reasons, the above preferred embodiment has specified the thickness of these filters to be in a range from 2 microns to a maximum of 50 microns.

Depending on the method of use and the environment in which the image display panel is used, hard-coating layer 5 may also be provided on the outer surface of RGB filter. Desirably, the hard-coating layer 5 should be composed of UV-hardening acrylic resin having about 5 microns of thickness.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An image display panel comprising:

a plurality of cathode ray tubes each being provided with a face plate in the front;

a plurality of red luminous bodies, green luminous bodies, and blue luminous bodies, which are disposed on the inside of said face plate and which illuminate themselves respectively in red, green, and blue when irradiated by electron beams;

a plurality of red filters, green filters, and blue filters, which are disposed in the outside of said face plate respectively in correspondence with said red luminous bodies, green luminous bodies, and blue luminous bodies; and a plurality of hard-coating layers which protect said filters respectively.

2. The image display panel as set forth in claim 1, wherein each of said filters is substantially composed of a mixture of binders and colorants.

3. The image display panel as set forth in claim 2, wherein said binder material is substantially made of urethane acrylate.

4. The image display panel as set forth in claim 2, wherein the material of said binder is selected from a group of acrylic, urethane, and silicone resins.

5. The image display panel as set forth in claim 1, wherein the thickness of each of said filters is 2 microns through a maximum of 50 microns.

6. The image display panel as set forth in claim 1, wherein said hard-coating layer is transparent.

7. The image display panel as set forth in claim 1, wherein said hard-coating layer is colored.

8. An image display panel comprising:

a plurality of cathode ray tubes each being provided with a face plate in the front;

a plurality of red luminous bodies, green luminous bodies, and blue luminous bodies, which are disposed on the inside of said face plate and which illuminate themselves respectively in red, green, and blue when irradiated by electron beams; and a plurality of red filters, green filters, and blue filters, which are disposed in the outside of said face plate respectively in correspondence with said red luminous bodies, green luminous bodies, and blue luminous bodies, each of said filters being substantially composed of a mixture of binders and colorants with 2 through 35 of colorant to 100 of binder.

9. An image display panel comprising:

a plurality of cathode ray tubes each being provided with a face plate in the front;

a plurality of red luminous bodies, green luminous bodies, and blue luminous bodies, which are disposed on the inside of said face plate and which illuminate themselves respectively in red, green, and blue when irradiated by electron beams; and a plurality of red filters, green filters, and blue filters, which are disposed in the outside of said face plate respectively in correspondence with said red luminous bodies, green luminous bodies, and blue luminous bodies, each of said filters being substantially composed of a mixture of binders and colorants wherein said colorant includes blended colorants substantially composed of quinacridone, bromic, and phthalocyanine pigments.

* * * * *

UNITED STATES PATENT AND TRADEMARK OFFICE

CERTIFICATE OF CORRECTION

PATENT NO. : 5,028,840

DATED : July 2, 1991

INVENTOR(S) : Kazuo UESAKA, et al.

It is certified that error appears in the above-identified patent and that said Letters Patent is hereby corrected as shown below:

Column 4, lines 23-33 changed to:

| | Resistance against Delustering Effect | Resistance against Discoloration, Fading and Whitening Effect |
|---|---|---|
| Blends-Blue | o | o |
| Blends-Green | o | o |
| Blends-Red | o | o |
| Single-Blue | Δ~X | Δ~X |
| Single-Green | Δ~X | Δ~X |
| Single-Red | Δ~X | Δ~X |

Signed and Sealed this

Ninth Day of February, 1993

*Attest:*

STEPHEN G. KUNIN

*Attesting Officer*

*Acting Commissioner of Patents and Trademarks*